Aug. 25, 1931.  J. M. BROWN  1,820,691
SWITCH MECHANISM
Filed March 10, 1927   2 Sheets-Sheet 1
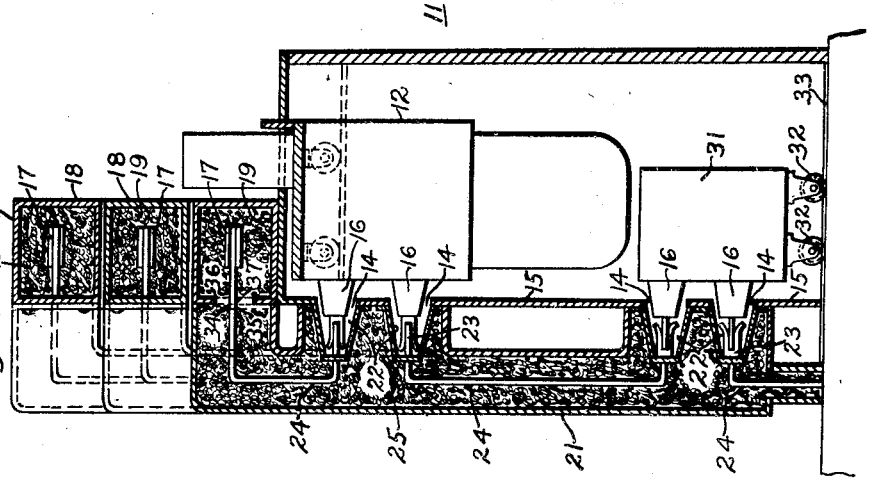
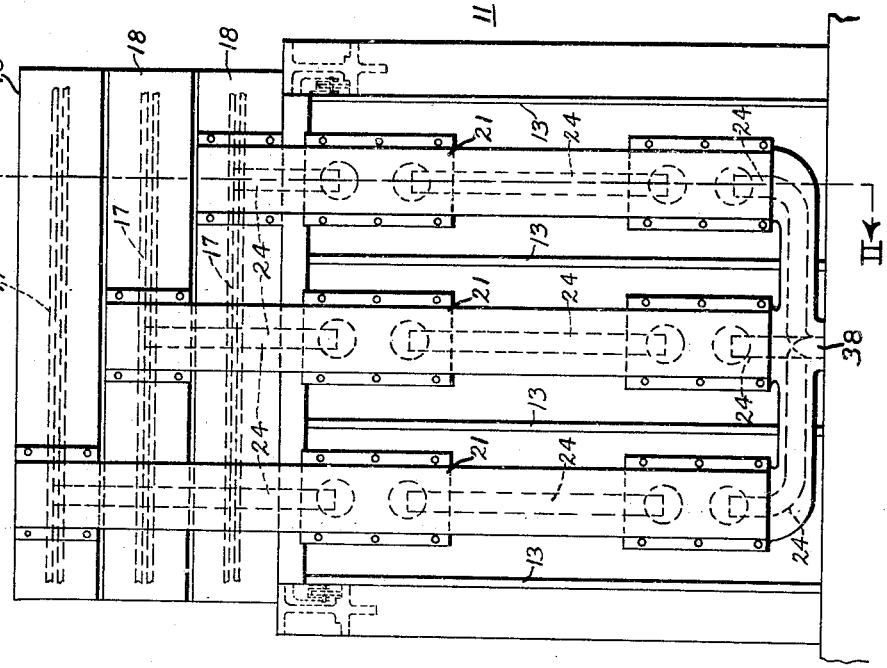
WITNESSES:
R. S. Williams
INVENTOR
James M. Brown, By
Jane D. Brown, Administratrix
BY
ATTORNEY Aug. 25, 1931.  J. M. BROWN  1,820,691
SWITCH MECHANISM
Filed March 10, 1927  2 Sheets-Sheet 2

WITNESSES:
R. S. Williams
Harrison Yates

INVENTOR
James M. Brown, By
Jane D. Brown, Administratrix
BY
Wesley G. Carr
ATTORNEY Patented Aug. 25, 1931

1,820,691

UNITED STATES PATENT OFFICE

JAMES M. BROWN, DECEASED, LATE OF PITTSBURGH, PENNSYLVANIA, BY JANE D. BROWN, ADMINISTRATRIX, OF PITTSBURGH, PENNSYLVANIA, ASSIGNOR TO WESTINGHOUSE ELECTRIC AND MANUFACTURING COMPANY, A CORPORATION OF PENNSYLVANIA

SWITCH MECHANISM

Application filed March 10, 1927. Serial No. 174,109.

The invention relates to switch mechanisms and particularly to switch mechanisms of the iron-clad draw-out type.

One object of the invention is to provide a switch mechanism comprising a compound-filled stationary structure in which bus bars, conductors and other live parts are disposed, a stationary cell structure adapted to cooperate with the compound-filled structure divided into cells for separately disposing a plurality of circuit breakers, voltage transformers and other well known switch gear that shall cooperate with the bus bars and conductors disposed in the compound-filled structure.

Another object of the invention is to provide a switch mechanism comprising a compound-filled structure divided into a plurality of separate filled casings wherein the different phases of the circuit are individually disposed, a stationary cell structure associated with the compound-filled structure having a plurality of cells for separately disposing single-pole circuit breakers that shall cooperate with the respective conductors and bus bars of the different phases.

Another object of the invention is to provide a switch mechanism comprising a plurality of stationary cells having a single-pole circuit breaker disposed in each cell in side-by-side relation, a structure comprising a plurality of compound-filled compartments, each compartment having a bus bar disposed in parallel vertical relation, and a plurality of compound-filled risers having conductors therein extending upwardly unequal distances from a common base for cooperation with the several bus-bar compartments, the risers having recesses therein for disposing terminals permanently connected to the conductors that are intended to cooperate with the respective circuit breakers.

Heretofore, it has been the practice, in certain constructions of the iron-clad draw-out type switch mechanisms, to provide a compound-filled compartment for the bus bars of all phases of a circuit. It has been found in practice, however, that it often happens that a short-circuit or other trouble developing in one phase is transmitted to one or more of the other phases disposed in the same compound-filled compartment and there has been, accordingly, provided a switch structure for isolating each phase, whereby the compartment containing the bus bar or conductor of the defective phase may be removed from the mechanism and a new one substituted, thereby affording protection to the other phases, and greatly reducing the cost of repairs.

The foregoing and other objects will become apparent throughout the following description of the invention, as embodied in the apparatus hereinafter described, and illustrated in the accompanying drawings, wherein, Figure 1 is a rear view, in elevation, of a switch mechanism embodying the invention.

Fig. 2 is a sectional view taken along the line II—II of Fig. 1 and

Figure 3:
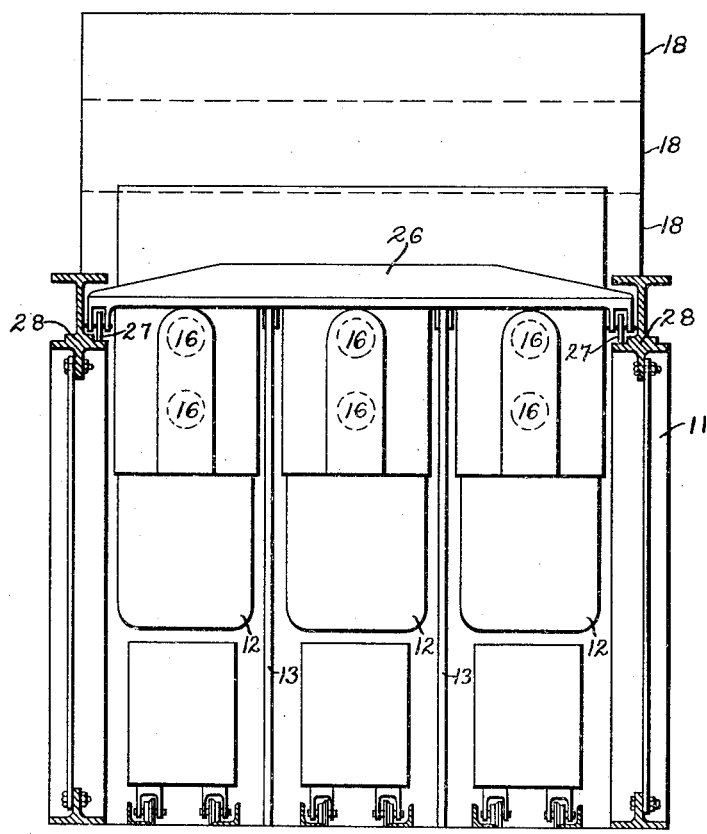
Fig. 3 is a front elevational view, partly in section, of a switch mechanism embodying the invention.

In practicing the invention, a draw-out type switch mechanism 11 for a polyphase system is provided comprising a single-pole circuit breaker 12 for each phase of the system, and a metal wall 13 arranged so that each circuit breaker is enclosed within its individual cell. The cells for the various line phases are located side by side and have openings 14 in the rear walls 15 thereof through which the disconnecting contact members 16 of the circuit breakers 12 extend. Horizontal bus bars 17, individual to the various line phases, are arranged above the enclosures 13, each within a casing 18 preferably of non-magnetic metal filled with insulating compound 19. There has been further provided a vertical conduit 21 also preferably of non-magnetic metal communicating with each of the different casings 18, the conduits 21 having recesses 22 in the face adjacent the enclosure 13 and registering with the openings 14 in the rear walls 15 thereof. The recesses 22 are provided with permanent contact members 23 for engaging the disconnecting-contact members 16 when the circuit breaker 12 is in its operative position within the enclosure 13. A conductor 24 within each conduit 21 connects a contact member 23 therein with its proper bus bar 17. The said conduit 21 is filled with insulating compound 25.

Referring to the drawings, a group of circuit breakers 12 controlling the different phases of a single branch circuit is mounted on a supporting member 26. The supporting member 26 is provided with wheels 27 which cooperate with a portion 28 of the frame work of the enclosures 13 for moving the circuit breakers into and out of engagement with the permanent contact members 23.

Such movement of the circuit breakers can, however, take place only when their contacts are open since the circuit breakers are prevented from movement towards or away from the permanent contact members when the breaker contacts are in closed position by interlocking means (not shown).

There has been provided also spaces in the lowest portions of the enclosures 13 to contain current and voltage transformers 31 and openings 14 are provided in the rear walls of the enclosures through which the disconnecting-contact members 16 of the current and voltage transformers extend. The openings 14 issue into recesses 22 containing terminals 23 of the risers 24. By this arrangement, it will be seen that the current and voltage transformers 31 are connected to their proper conductors 24. The current and voltage transformers 31 are mounted on wheels 32 which run upon a track 33 on the frame work of the enclosures 13, so that the disconnecting-contact members 16 of the current and voltage transformers 31 may be moved readily into and out of engagement with the corresponding permanent terminals 23.

The current and voltage transformers are prevented from movement toward or away from the permanent contact members when the breaker contacts are in closed position by interlocking means (not shown).

The bus bar casings 18 are disposed in vertical relation above the enclosures 13, each casing being adapted to be removed without interference with the other casings for substitution or repair.

The risers 21 are separately disposed and spaced apart in parallel relation and extend upwardly unequal distances from a common base for cooperating with their respective bus-bar casings 18. The risers 21 are fixed to the casings 18 by any suitable means that will form an oil-tight joint. The faces 34 of the risers 21 are provided with openings 35, and the faces 36 of the casings 18 are provided with openings 37 registering with the openings 35 in the faces 34 of the risers 21 for permitting the conductors 24 to connect with their respective bus bars 17.

The risers 21 enclosing the conductors 24 terminate at the bottom of the switch mechanism 11 at a common pot head 38, as shown in Figure 1.

Accordingly, there has been provided a switch mechanism of the iron-clad drawout type in which the bus bars and conductors of each phase of a polyphase circuit are separately enclosed in a separate compound-filled structure, each structure being adapted to be removed without interference with the other structures and, by means of the separate enclosure, protection is afforded the adjacent bus bars and repairs thereto are greatly reduced.

While there has been illustrated and described but one embodiment of the invention, it will be apparent to those skilled in the art that certain changes, modifications, substitutions, additions and omissions may be made in the mechanism above described without departing from the spirit and scope of the appended claims.

The invention claimed is:

1. A draw-out-type switch mechanism for a polyphase system comprising a single-pole circuit breaker for each phase of the system, a separate metal enclosure for each circuit breaker, arranged in side-by-side relation and having openings in the rear walls thereof through which the disconnecting-contact members of the circuit breaker extend, horizontal bus bars arranged above the enclosures, casings surrounding the bus bars filled with insulating compound, a vertical conduit for communicating with each enclosure having recesses in the face adjacent the enclosure and registering with the openings in the rear walls thereof and provided with permanent contact members disposed within the recesses for engaging the disconnecting-contact members when the circuit breaker is in its operative position within the enclosure, and a conductor within each conduit for connecting a contact member therein with its proper bus bar, the said conduit being filled with insulating compound.

2. A switch structure comprising a cell for enclosing a bodily movable circuit breaker having a disconnect contact projecting therefrom, the cell having an opening therein aligned with the said contact, a main conduit having a main bus bar therein and provided with an opening in a side wall thereof, a branch conduit having an opening registering with that in the cell, a recessed closure for the opening in the branch conduit, a contact terminal supported therein, a branch bus bar connected to the contact terminal and projecting from another opening in the branch conduit and projecting therefrom into engagement with the main bus bar when the branch conduit is in operative position, the said conduit serving to close the said openings in the cell and main conduit and support the contact member in alignment with the said disconnect contact, whereby the latter may engage the contact terminal when the circuit breaker is moved into operative position.

In testimony whereof, I have hereunto subscribed my name this 5th day of March, 1927.

JANE D. BROWN,
*Administratrix of the Estate of James M. Brown, Deceased.*